US008764382B2

(12) United States Patent
Dimelow

(10) Patent No.: US 8,764,382 B2
(45) Date of Patent: Jul. 1, 2014

(54) METHOD FOR FORMING A PRESSURE MEASUREMENT HOLE IN A COMPONENT

(75) Inventor: Stephen Jonathan Dimelow, Staffordshire (GB)

(73) Assignee: Rolls-Royce PLC (GB)

( * ) Notice: Subject to any disclaimer, the term of this patent is extended or adjusted under 35 U.S.C. 154(b) by 908 days.

(21) Appl. No.: 12/883,710

(22) Filed: Sep. 16, 2010

(65) Prior Publication Data

US 2011/0081230 A1    Apr. 7, 2011

(30) Foreign Application Priority Data

Oct. 6, 2009    (GB) .................................. 0917410.3

(51) Int. Cl.
*F01D 25/00*    (2006.01)

(52) U.S. Cl.
USPC ........................................................ 415/118

(58) Field of Classification Search
USPC .......... 415/142, 118, 229; 416/61; 73/118.03, 73/178 R, 502, 866.5; 29/889.1, 889.2, 29/525.01, 525.13, 426.1
See application file for complete search history.

(56) References Cited

U.S. PATENT DOCUMENTS

| 4,872,807 | A | | 10/1989 | Thompson | |
|---|---|---|---|---|---|
| 5,488,868 | A | * | 2/1996 | Ootake et al. | 73/708 |
| 6,374,685 | B1 | * | 4/2002 | Daly | 73/866.5 |
| 6,513,971 | B2 | * | 2/2003 | Tubbs | 374/144 |
| 2006/0088793 | A1 | * | 4/2006 | Brummel et al. | 431/13 |
| 2007/0125090 | A1 | * | 6/2007 | Martis et al. | 60/773 |

FOREIGN PATENT DOCUMENTS

| DE | 19645164 C1 | 4/1998 |
|---|---|---|
| EP | 1145952 A1 | 10/2001 |
| EP | 1405986 A2 | 4/2004 |
| WO | 0063070 A1 | 10/2000 |
| WO | 2005085065 A1 | 9/2005 |

OTHER PUBLICATIONS

European Search Report from corresponding EP Patent Application No. EP 10174259 dated Nov. 22, 2013.

* cited by examiner

*Primary Examiner* — Nathaniel Wiehe
*Assistant Examiner* — Adam W Brown
(74) *Attorney, Agent, or Firm* — McCormick, Paulding & Huber LLP

(57) ABSTRACT

A method for forming a pressure measurement hole in a component includes the step of forming a hole in a body of the component, the hole extending from a body surface of the component. An insert having a longitudinal passage is fitted into the hole such that the insert protrudes from the body surface. The protruding end of the insert is machined to define an insert surface profile matched to the body surface profile and displaced from the body surface by a distance substantially equal to a thickness of a covering layer that is to be bonded onto the body surface. A blocking pin is inserted into the insert passage. The covering layer is then bonded to the body surface in the region of the hole and insert after which the blocking pin is removed from the insert to open the pressure measurement hole.

15 Claims, 3 Drawing Sheets

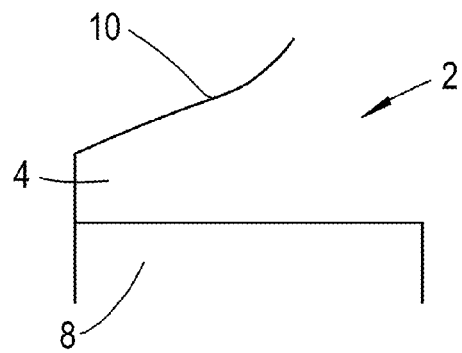
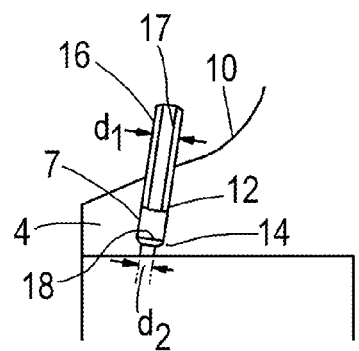
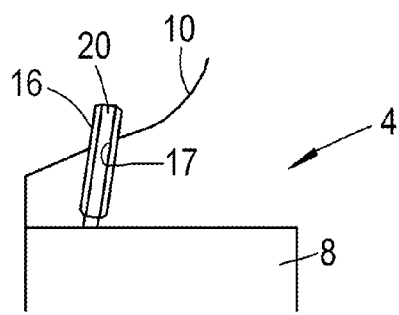
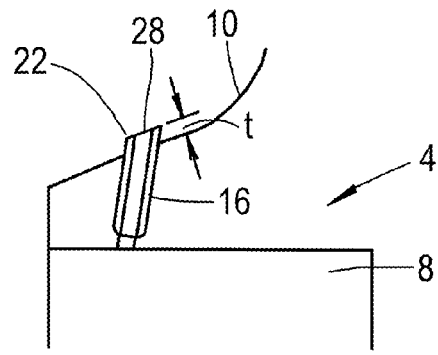

METHOD FOR FORMING A PRESSURE MEASUREMENT HOLE IN A COMPONENT

CROSS REFERENCE TO RELATED APPLICATION

This application is entitled to the benefit of British Patent Application No. GB 0917410.3 filed on Oct. 6, 2009.

FIELD OF THE INVENTION

The present invention relates to a method for forming a pressure measurement hole in a component, and to components including such a hole. The invention is particularly, though not exclusively, concerned with the formation of static pressure measurement holes in components where ice build up during use is a particular risk. Static pressure measurement is required in a wide variety of applications including, for example, gas turbine engines.

BACKGROUND OF THE INVENTION

One example of a component where static pressure measurement is required is a bearing housing located at the front end of certain gas turbine engines. The bearing housing has an inner ring 100 of a strutted case assembly, as illustrated in FIG. 1. The inner ring houses the bearing and includes a plurality of radial struts connecting it to an outer ring which in turn connects the fan case assembly to the nose cowling. The inner ring may be manufactured with machined strut stubs 102 designed to accept struts which may be fitted later by bolting or welding.

In order to assist with control of the engine it is necessary to measure the stagnation pressure in front of the inner root of the strut stubs. This pressure measurement is electronically fed back to the engine control system, and variable geometry within the engine (Variable Inlet Guide Vane (VIGV)) is altered to suit the measured conditions. Pressure is measured via static pressure measurement holes 20 that are located at the root of the strut stubs and communicate with a pressure manifold 8.

The pressure manifold 8 with which the holes communicate is formed as an annular slot, which may be continuous or discontinuous and is sealed by an end plate 30. The manifold 8 can thus link several or all of the static pressure measurement holes 20 into a single pressure vessel. A transducer in the manifold gives a collective reading for the grouped static pressure measurement holes.

The geometry of static pressure measurement holes is critical for their functionality. In order to work the hole must be normal to the gas flow or angled, for example at 30°, away from the flow as illustrated in FIG. 2. Angling the hole away from the flow discourages ingress of water into the manifold which would adversely affect pressure readings. In order to function correctly, the internal diameter of a static pressure measurement hole must be continuous along its entire length and must remain unobstructed. During operation, ice can build up around the mouth of the hole, partially blocking the hole and adversely affecting readings. In order to prevent this, a heater mat 6 may be bonded to the external surfaces of the inner ring (see FIG. 1). However, any local break in the gas flow over the opening of the hole will adversely affect the readings. If a heating mat is sited close enough to the hole to prevent ice build up from blocking the hole, the presence of the mat will inevitably cause local gas flow disturbance sufficient to prevent the hole from functioning correctly. Such a situation is illustrated in FIG. 2.

SUMMARY OF THE INVENTION

According to the present invention, there is provided a method for forming a pressure measurement hole in a component, the component having a body having a surface that defines a body surface profile and a covering layer that defines a layer thickness, the method has the steps of:

forming a hole in the body that extends from the body surface;

fitting an insert into the hole such that, when fitted in the hole, the insert protrudes from the body surface, the insert having a longitudinal passage;

machining the protruding end of the insert to define an insert surface profile that is matched to the body surface profile and displaced from the body surface by a distance substantially equal to the layer thickness;

(i) inserting a blocking pin into the passage of the insert to seal the passage of the insert;

(ii) bonding the covering layer to the body surface in the region of the hole and insert; and (iii) removing the blocking pin from the insert.

It is an advantage of the present invention that the resulting pressure measurement hole breaks a gas washed surface with a sharp edge defined by the insert, thus facilitating accurate measurement. As a result of the blocking pin being present during bonding of the covering layer, the pressure measurement hole is free from adhesive, and no expensive and difficult cleaning is required after the covering layer has been bonded to the body of the component. In fact, no process steps that risk damaging an in situ covering layer, such as machining, drilling or cleaning, are required once the covering layer has been bonded to the body of the component.

It is a further advantage of the present invention that the method results in a pressure measurement hole that presents a continuous gas washed aeroline, the covering layer and insert defining a continuous surface profile. Any voids that may exist between the covering layer surrounding the insert and the insert itself are automatically filled with adhesive during the process of bonding the covering layer to the body of the component. During the bonding process, the viscosity of the adhesive is reduced and adhesive flows to fill any voids while the blocking pin prevents the adhesive from flowing into the hole itself.

It will be appreciated that the method of the present invention facilitates formation of the pressure measurement hole at the correct angle for optimum functionality without requiring complicated or expensive manufacturing processes.

The hole formed in step (i) of the method may be stepped. The hole may thus comprise an outer portion which receives the insert, and an inner portion having a smaller diameter than the outer portion. The diameter of the inner portion may be the same as that of the passage in the insert. The method thus results in a pressure measurement hole having the continuous internal diameter required for optimum functionality.

The insert may be displaced into the hole to abut a step in the hole between the outer and inner portions. The step may be formed at the correct level within the body of the component to result in a suitable length of the insert projecting from the body surface for machining to the required surface profile.

Step (iv) of the method may include the stop of inserting the blocking pin into the passage of the insert until the blocking pin contacts an internal surface of the body of the component, which thus acts as a depth stop.

The hole formed in the component may open into a chamber defined within the body of the component. The method may further include the step of forming a plurality of holes to extend from the body surface and open into the chamber.

The present invention further provides a component having a pressure measurement hole formed by the method of the present invention.

According to another aspect of the present invention, there is provided a component having:
 (i) a body having a body surface that defines a body surface profile; and
 (ii) a covering layer bonded to the body surface and defining a layer thickness;
 (iii) wherein a pressure measurement hole extends inwardly of the body from the body surface,
 (iv) the pressure measurement hole being at least partially defined by an insert having a longitudinal passage, an end of the insert protruding from the body surface through the covering layer to define an insert surface profile,
 (v) the insert surface profile matching the body surface profile and being displaced from the body surface by a distance substantially equal to the layer thickness.

The covering layer, insert and pressure measurement hole may define a smooth aeroline, thus facilitating accurate pressure measurement. It will be appreciated that the covering layer of the component of the present invention is situated close enough to the pressure measurement hole to perform its function and yet does not result in a surface discontinuity that could disrupt local gas flow and hence adversely affect the functionality of the hole.

Any voids between the covering layer and the insert may be filled with adhesive. This adhesive assists in the definition of a smooth surface profile.

The pressure measurement hole and insert may define a smooth internal diameter as required for optimum functionality of the pressure measurement hole.

The covering layer may be a heater mat.

The component may comprises a chamber defined within the body, and a plurality of pressure measurement holes may extend inwardly of the body from the body surface to open into the chamber.

The component may be an inner case ring of a gas turbine engine.

The present invention further provides a gas turbine engine comprising a component in accordance with the present invention.

BRIEF DESCRIPTION OF THE DRAWINGS

For a better understanding of the present invention, and to show more clearly how it may be brought into effect, reference will now be made, by way of example, to the following drawings, in which:

FIG. 3 is a sectional view of an unfinished inner case ring.

FIGS. 4 to 9 are views of the inner case ring of FIG. 3 during the formation of a pressure measurement hole by a method in accordance with the present invention.

DETAILED DESCRIPTION OF THE PREFERRED EMBODIMENTS

Figure 1:
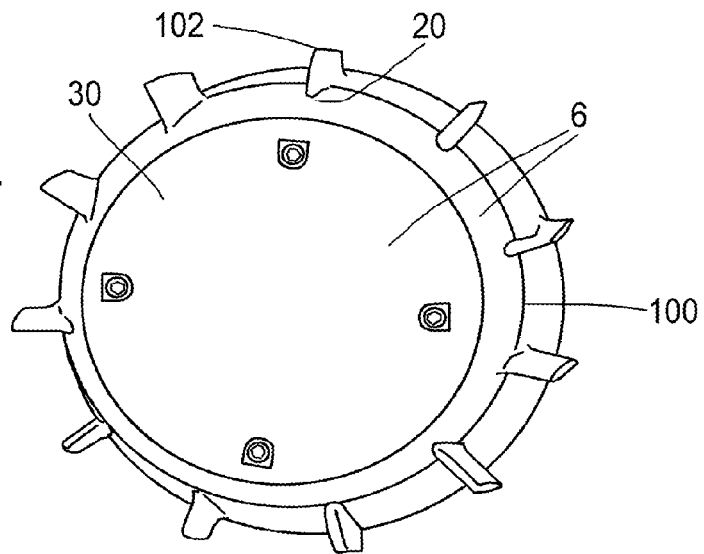
FIG. 1 is a perspective view of a front strutted inner case ring of a gas turbine engine of the prior art.
Figure 2:
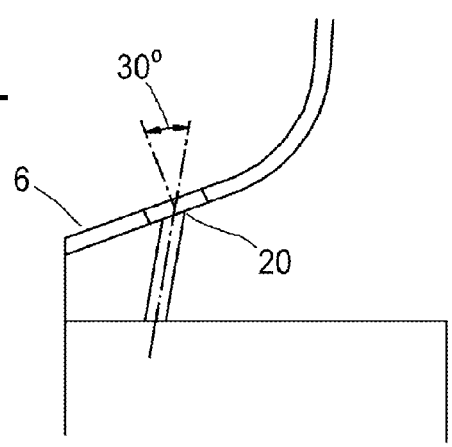
FIG. 2 is a sectional view of the inner case ring of FIG. 1 having a heating mat bonded to the component surface.
Figure 7:
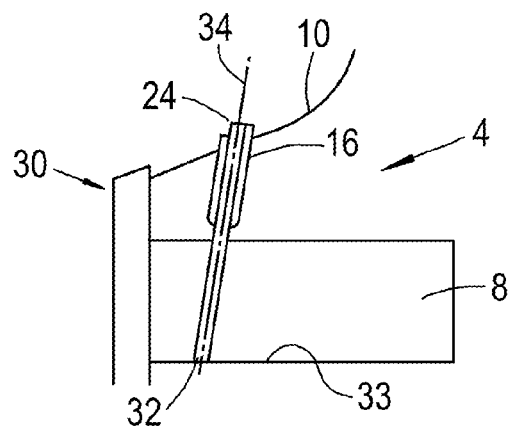

A method for forming a pressure measurement hole in a component is described below.

With reference to FIGS. 3 to 9, an inner casing ring component 2 in which a pressure measurement hole is to be formed comprises a component body 4 and a covering layer in the form of a heater mat 6 that is to be bonded to the component body 4 during manufacture. The component body 4 comprises an internal manifold 8 and a body surface 10 that defines a body surface profile.

In a first step, a hole 7 is drilled in the component body 4 that extends from the body surface 10 to open into the interior manifold 8. The hole 7 is drilled at an angle of approximately 30 degrees to the normal of the body surface 10 at the point at which the hole enters the body surface 10. The hole 7 is angled away from the direction in which air will flow over the component when in use. The drilled hole 7 has two distinct portions; a first, outer portion 12 that is drilled to a first diameter $d_1$ and a second, inner portion 14 that is drilled to a second diameter $d_2$. The first diameter $d_1$ forms a close fit with an insert 16 (FIG. 4), while the second diameter $d_2$ is equal to the diameter of a passage 17 in the insert 16. The transition between the outer portion 12 at the first diameter $d_1$ and the inner portion 14 at the second diameter $d_2$ forms an annular step 18 in the hole 7.

As shown in FIG. 6, the insert 16 is displaced into the hole 7 and is sized to fit closely into the outer portion 12 of the hole, an end of the insert 16 seating against the annular step 18 in the hole 7 (FIG. 5). The internal diameter of the passage 17 of the insert 16 is equal to the second diameter $d_2$ of the inner portion 14 of the hole 7. In this manner, the inner portion 14 of the hole 7 and the insert 16 define a continuous diameter pressure measurement hole 20. The insert 16 is sized such that an end of the insert 16 protrudes out of the hole 7 and past the body surface 10 as illustrated in FIG. 5.

Next, as shown in FIG. 6, the end of the insert 16 that is protruding out of the hole 7 is machined so that the protruding annular surface 22 of the insert 16 has a surface profile that is matched to the surface profile of the body surface 10 from which it protrudes. The annular surface 22 of the insert 16 is displaced from the body surface 10 by a distance t that is equal to the thickness of the heater mat 6 that is to be bonded to the component body 4 at a later stage.

A sealing plate 30 is then fitted to the body 4 of the inner case ring 2 in order to seal the internal manifold 8 and create a pressure vessel for the measurement of static pressure. It will be appreciated from FIG. 1 that the measurement hole 20 shown in FIG. 5 is one of a plurality of such holes distributed around the inner case ring 2 at the root of each strut stub 102.

A blocking pin 24 (FIG. 7) is then inserted into the insert 16 to occupy the pressure measurement hole 20. Insertion of the pin 24 is arrested by contact between the inserting end 32 of the blocking pin 24 and a wall 33 of the manifold 8. When the pin 24 is fully inserted, a free end 34 of the pin 24 protrudes a short distance from the insert 16. This distance may be the minimum amount required for the pin 24 to be grasped by pliers or other tools used for manipulation of the pin 24. The pin 24 is tapered slightly so that, when fully inserted, it forms a transition or interference fit with the mouth 28 of the passage 17.

Figure 8:
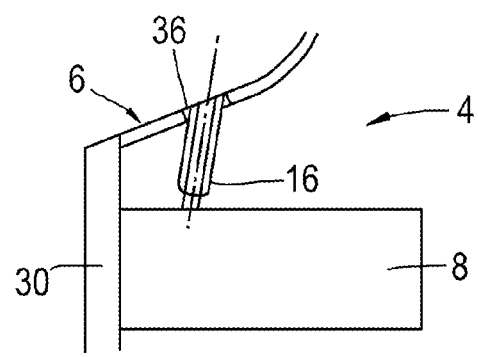

The heater mat 6 is then bonded to the surface 10 of the body 4 of the inner case ring, as shown in FIG. 8. Bonding takes place at high temperature, resulting in a reduction in the viscosity of the bonding agent. The bonding agent therefore flows to fill any voids 36 between the protective heating mat 6 and the annular liner 16. However, the blocking pin 24 prevents the bonding fluid from flowing into the passage 17.

Once the heater mat 6 has been bonded to the body 4, the blocking pin 24 is removed to open the passage 17 and thus the pressure measurement hole 20 and complete the procedure.

Figure 9:
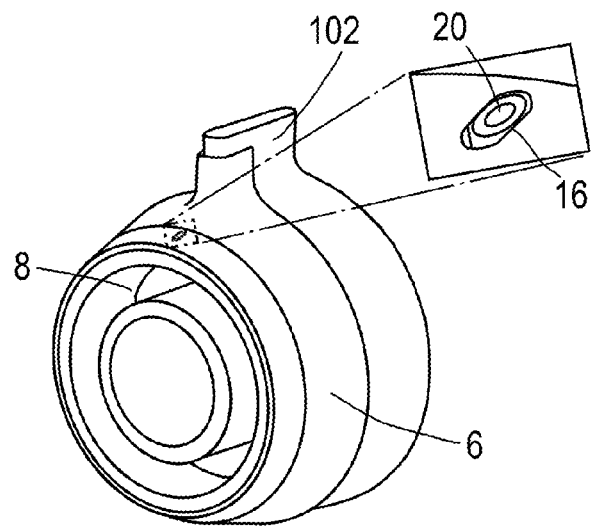

It will be appreciated that, as illustrated in FIGS. 8 and 9, the method described results in an inner case ring having a pressure measurement hole 20 that opens to a gas washed surface with a sharp edge defined by the insert 16. A heating mat 6 is bonded to the body 4 of the inner casing ring and is close enough to the pressure measurement hole 20 to perform its function and prevent build up of ice in and around the hole 20. The insert 16, assisted in part by the bonding agent filling any small voids 36, ensures that the heater mat 6 does not cause any local surface discontinuities. The pressure measurement hole 20, constituted at its upper end by the passage 17, opens onto a gas washed surface defined by the annular insert surface 22 and the surface of the heater mat 6. As the heater mat 6 is of constant thickness t and mirrors the underlying component body surface 10, the machining of annular insert surface 22 to match the body surface 10 ensures that the insert 16 and heater mat 6 present a continuous aeroline with no local discontinuities to cause disruption to the gas flow. The pressure measurement hole 20 can thus ensure accurate measurement of static pressure at the gas washed surface. FIG. 9 shows only a single strut stub 102 and associated hole 20, but it will be appreciated that there is a plurality of such strut stubs 102 and holes 20, as shown in FIG. 1.

It will also be appreciated that the method described above produces an advantageous inner case ring without requiring complicated machining, or requiring any processing of the pressure measurement hole and surrounding area after bonding of the heating mat 6. The risk of damage to the heating mat 6 is therefore greatly reduced.

Although the invention has been described with reference to an inner ring of a strutted case assembly of a gas turbine engine, it will be appreciated that the method described can be applied to any component in which static pressure measurement is required at a surface where there is a risk of ice build up.

What is claimed is:

1. A method for forming a pressure measurement hole in a component, the component comprising a body having a surface that defines a body surface profile and a covering layer that defines a layer thickness,
   the method comprising the steps of:
   (i) forming a hole in the body that extends from the body surface;
   (ii) fitting an insert into the hole such that, when fitted in the hole, the insert protrudes from the body surface, the insert having a longitudinal passage;
   (iii) machining the protruding end of the insert to define an insert surface profile that is matched to the body surface profile and displaced from the body surface by a distance substantially equal to the layer thickness;
   (iv) inserting a blocking pin into the passage of the insert to seal the passage of the insert;
   (v) bonding the covering layer to the body surface in the region of the hole and insert; and
   (vi) removing the blocking pin from the insert.

2. A method as claimed in claim 1, wherein the hole formed in step (i) is a stepped hole.

3. A method as claimed in claim 2, wherein the hole comprises an outer portion which receives the insert, and an inner portion having a smaller diameter than the outer portion.

4. A method as claimed in claim 3, wherein in step (ii) the insert is displaced into the hole to abut a step in the hole between the outer and inner portions.

5. A method as claimed in claim 1, wherein step (iv) comprises inserting the blocking pin into the passage until the blocking pin contacts an internal surface of the body.

6. A method as claimed in claim 1, wherein the hole opens into a chamber defined within the body of the component.

7. A method as claimed in claim 6, further comprising forming a plurality of holes to extend from the body surface and open into the chamber.

8. A component comprising:
   a body having a body surface that defines a body surface profile facing on a passageway; and
   a covering layer bonded to the body surface and defining a layer thickness;
   wherein a pressure measurement hole extends inwardly of the body from the body surface,
   the pressure measurement hole being at least partially defined by an insert having a longitudinal passage, an end of the insert protruding from the body surface through the covering layer to define an insert surface profile also facing on the passageway,
   the insert surface profile matching the body surface profile and being displaced from the body surface by a distance substantially equal to the layer thickness.

9. A component as claimed in claim 8, wherein the covering layer, insert and pressure measurement hole define a continuous gas washed surface.

10. A component as claimed in claim 8 wherein any voids between the covering layer and the insert are filled with adhesive.

11. A component as claimed in claim 8, wherein the pressure measurement hole and insert define a smooth internal diameter.

12. A component as claimed in claim 8, wherein the component comprises a chamber defined within the body, and a plurality of pressure measurement holes extend inwardly of the body from the body surface to open into the chamber.

13. A component as claimed in claim 8, wherein the component is an inner case ring of a gas turbine engine.

14. A component comprising:
   a body having a body surface that defines a body surface profile; and
   a covering layer bonded to the body surface and defining a layer thickness;
   wherein a pressure measurement hole extends inwardly of the body from the body surface,
   the pressure measurement hole being at least partially defined by an insert having a longitudinal passage, an end of the insert protruding from the body surface through the covering layer to define an insert surface profile,
   the insert surface profile matching the body surface profile and being displaced from the body surface by a distance substantially equal to the layer thickness,
   wherein the covering layer is a heater mat.

15. A gas turbine engine comprising:
   a casing,
   an air intake,
   a propulsive fan,
   a pressure compressor,
   a combustor,
   a turbine arrangement,
   an exhaust nozzle, and
   a component having
     a body with a body surface that defines a body surface profile facing the air intake; and
     a covering layer bonded to the body surface and defining a layer thickness;

wherein a pressure measurement hole extends inwardly of the body from the body surface, the pressure measurement hole being at least partially defined by an insert having a longitudinal passage, an end of the insert protruding from the body surface through the covering layer to define an insert surface profile also facing the air intake, the insert surface profile matching the body surface profile and being displaced from the body surface by a distance substantially equal to the layer thickness.

* * * * *